United States Patent [19]

Hoch et al.

[11] 4,217,455

[45] Aug. 12, 1980

[54] PREPARATION OF TRANSPARENT AND EASILY DISPERSIBLE PERYLENE-3,4,9,10-TETRACARBOXYLIC ACID DIIMIDE PIGMENTS OF HIGH TINCTORIAL STRENGTH

[75] Inventors: Helmut Hoch; Heinrich Hiller, both of Wachenheim, Fed. Rep. of Germany

[73] Assignee: BASF Aktiengesellschaft, Ludwigshafen, Fed. Rep. of Germany

[21] Appl. No.: 3,980

[22] Filed: Jan. 16, 1979

[30] Foreign Application Priority Data

Jan. 26, 1978 [DE] Fed. Rep. of Germany ....... 2803362

[51] Int. Cl.$^2$ ..................... C09B 3/18; C09B 67/00; C07D 471/06
[52] U.S. Cl. ........................................ 546/37; 8/637
[58] Field of Search ........................................ 546/37

[56] References Cited

U.S. PATENT DOCUMENTS

| | | | |
|---|---|---|---|
| 2,543,747 | 3/1951 | Shrader | 260/281 |
| 3,340,254 | 9/1967 | Jentzsch | 260/239.3 |
| 3,340,264 | 9/1967 | Walker | 260/281 |
| 4,115,386 | 9/1978 | Gall et al. | 546/37 |

FOREIGN PATENT DOCUMENTS

| | | |
|---|---|---|
| 386057 | 5/1919 | Fed. Rep. of Germany . |
| 1197185 | 7/1965 | Fed. Rep. of Germany . |
| 2013672 | 10/1971 | Fed. Rep. of Germany . |
| 2121999 | 11/1971 | Fed. Rep. of Germany . |
| 2545701 | 4/1977 | Fed. Rep. of Germany . |
| 451943 | 5/1968 | Switzerland . |
| 835459 | 5/1960 | United Kingdom . |

OTHER PUBLICATIONS

Balmforth et al., B.I.O.S. Trip #2351, 9/9/46 to 11/7/46.

*Primary Examiner*—Mark L. Berch
*Attorney, Agent, or Firm*—Oblon, Fisher, Spivak, McClelland & Maier

[57] ABSTRACT

A process for the preparation of transparent pigmentary forms, of high tinctorial strength, of perylene-3,4,9,10-tetracarboxylic acid bis-p-phenetidide and bis-p-chloroanilide, in which the diimide concerned is converted to the leuco compound, and the latter, with or without prior isolation, is then oxidized in aqueous suspension in the presence of surfactants or while exposed to shearing forces in the presence or absence of surfactants, after which the pigment is isolated.

The pigments give highly transparent very pure colorations when used unreduced, while in white reductions they give very deep colorations with substantially more yellowish hues than those given by the prior art pigments.

11 Claims, No Drawings

PREPARATION OF TRANSPARENT AND EASILY DISPERSIBLE PERYLENE-3,4,9,10-TETRACARBOXYLIC ACID DIIMIDE PIGMENTS OF HIGH TINCTORIAL STRENGTH

The present invention relates to a process for the preparation of perylene-3,4,9,10-tetracarboxylic acid bis-p-phenetidide and perylene-3,4,9,10-tetracarboxylic acid bis-p-chloroanilide in a transparent and easily dispersible pigmentary form of high tinctorial strength.

Perylene-3,4,9,10-tetracarboxylic acid bis-p-phenetidide and bis-p-chloroanilide can be prepared by various methods of condensing perylene-3,4,9,10-tetracarboxylic acid, hereinafter also referred to as perylenetetracarboxylic acid, with the corresponding aniline derivatives:

(a) by reaction with excess p-chloroaniline (BIOS Report 1493.3);
(b) by condensation with the corresponding arylamines in the presence of hydrochloric acid (British Pat. No. 835,459);
(c) by reaction with p-chloroaniline in water in the presence of pyridine (U.S. Pat. No. 3,340,254);
(d) by reaction with p-chloroaniline as described in German Patent 386,057;
(e) by reaction with the corresponding arylamines in water under pressure (U.S. Pat. No. 2,543,757);
(f) by reaction with p-phenetidine in the absence of diluents in an oxygen-free atmosphere at 150°–300° C. (Swiss Pat. No. 451,943); or
(g) by reaction with p-phenetidine as described in German Pat. No. 1,113,773).

The products obtained by processes (a) to (f), when used as vat dyes, give red to bluish red colorations. The said products are, however, unsuitable for use as pigments for printing inks and surface coatings, or for use in coloring plastics, since they do not possess the tinctorial properties demanded of a pigment.

If perylenetetracarboxylic acid bis-p-phenetidide and bis-p-chloroanilide are to be used as pigments, they must be very pure. It is true that such pure products can be obtained by processes (a), (b), (c) and (f), but the products of these processes do not exhibit tinctorial properties suitable for pigmentary purposes. For this reason, the products are referred to as crude pigments, and must be converted to a finely divided form by suitable measures. Examples of such measures are reprecipitation from sulfuric acid, milling with or without milling assistants, or swelling in sulfuric acid, with or without subsequent treatment with an organic liquid.

According to German Pat. No. 1,113,773, the perylenetetracarboxylic acid bis-p-phenetidide obtained is suitable for direct use as a pigment for printing inks and surface coatings. However, on repeating the Example, we found that a very coarse-particled product was obtained, which on incorporation into printing inks gave dull and pale colorations.

German Laid-Open Application DOS 2,545,701 discloses a process by means of which a high-hiding pigmentary form of perylenetetracarboxylic acid bis-p-phenetidide is obtained.

German Laid-Open Application DOS 2,013,672, Example 5, describes the preparation of a pigmentary form of perylenetetracarboxylic acid bis-p-chloroanilide (prepared as described in German Pat. No. 386,057) by milling in an organic liquid. The resulting pigment is alleged to give bluish red colorations in surface coatings. No information regarding the transparency of the colorations is given.

German Laid-Open Application DOS 2,121,999, Example 5, describes a further method of conditioning by kneading perylenetetracarboxylic acid bis-p-chloroanilide with ammonium bicarbonate in the presence of toluene. The pigmentary form thus obtained is allegedly particularly suitable for coloring polyvinyl chloride.

Transparent pigmentary forms of perylenetetracarboxylic acid bis-p-chloroanilide and bis-p-phenetidide have not previously been described.

Whilst German Laid-Open Application DOS 2,545,701 describes a high-scattering pigmentary form of perylenetetracarboxylic acid bis-p-phenetidide having a specific surface area of from 10 to 35 $m^2/g$ (measured by the BET method), the object of the present invention is to provide a transparent pigmentary form having a large specific surface area, which, in white reductions, exhibits a substantially greater depth of color, and at the same time a substantially more yellowish hue, improved purity and good dispersibility.

It is an object of the present invention to provide a process by which perylenetetracarboxylic acid bis-p-phenetidide and bis-p-chloroanilide can be converted into pigmentary forms which in pure shades exhibit high transparency. It is a further object to provide a process which comprises simple and inexpensive synthesis and finishing steps.

We have found that transparent and easily dispersible pigmentary forms, of high tinctorial strength, of perylene-3,4,9,10-tetracarboxylic acid bis-p-phenetidide and perylene-3,4,9,10-tetracarboxylic acid bis-p-chloroanilide are obtained if the said bis-imide is converted to the leuco compound, which may or may not be isolated, thereafter the leuco compound is oxidized in aqueous suspension (a) in the presence of surfactants or (b) whilst exposed to shearing forces, in the presence or absence of surfactants, and the pigment is then isolated.

The pigments obtained by the process according to the invention are easily dispersible in printing inks, surface coatings and plastics. The specific surface area of these pigmentary forms is in general from 40 to 70 $m^2/g$ (measured by nitrogen adsorption in accordance with the BET method).

The vatting of the bis-imides to produce the leuco compound is normally carried out in aqueous alkaline suspension with dithionite, generally in from 20 to 80 parts by weight of water per part by weight of bis-imide. The amount of alkali metal hydroxide, which is preferably used in the form of sodium hydroxide solution, depends on the amount of dithionite, but is in general, when using sodium hydroxide, from 0.5 to 2 parts by weight, per part by weight of sodium dithionite. The required amount of dithionite, which is preferably used in the form of the sodium salt, is from 0.3 to 1.5 parts by weight, per part by weight of bis-imide.

The vatting is generally effected at from 10° to 80° C., especially at from 20° to 60° C. After from 0.5 to 2 hours, the reduction is normally complete and the salt of the leuco compound (hereafter also referred to simply as leuco compound, or as vat salt) has precipitated. The leuco compound can be separated off (isolated) or can be directly processed further, in the aqueous suspension obtained on vatting.

Isolating the leuco compound of the bis-imides, in the form of the salts, is advisable if a crude bis-imide is used which must be subjected to purification, for example to remove adhering perylenetetracarboxylic acid. In that case, the filter residue is advantageously washed with blank vat at from 20° to 30° C. until the filtrate is only pale violet in color. The blank vat used may conveniently be a solution of about 20 parts by weight of 50 percent strength by weight sodium hydroxide solution and about 10 parts by weight of sodium dithionite in 1,000 parts by weight of water.

If crude bis-imides, sufficiently pure for pigmentary purposes, are used as the starting materials, the leuco compound does not have to be isolated. In that case, the aqueous suspension obtained on vatting can be directly processed further by any of the methods described below.

The oxidation of the leuco compound is carried out in aqueous suspension by means of an oxidizing agent, usually after having added one or more surfactants. The pigmentary form is thereby obtained directly.

Examples of oxidizing agents are oxygen (eg. as atmospheric air), oxidizing salts, eg. nitrates and chlorates, dilute oxidizing acids, eg. dilute nitric acid, nitro compounds, eg. 3-nitrobenzenesulfonic acid, and hydrogen peroxide and its adducts, eg. perborates or percarbonates.

Since the oxidation takes place particularly rapidly with hydrogen peroxide or its adducts and the resulting pigmentary forms are particularly transparent, hydrogen peroxide and its adducts are preferred oxidizing agents.

The oxidation temperature is conveniently from 20° to 100° C., preferably from 40° to 80° C.

The surfactants to be used according to the invention may be cationic or, preferably, anionic or nonionic.

The amount of these surfactants is in general from 0.2 to 20, preferably from 0.5 to 15, percent by weight, based on the leuco compound.

Examples of anionic surfactants are $C_{13}$–$C_{18}$-paraffinsulfonic acids, $C_{13}$–$C_{18}$-paraffindisulfonic acids, sulfosuccinic acid di-$C_1$–$C_4$-alkyl esters, sulfonated oleic acid dibutylamide, $C_8$–$C_{18}$-alkylbenzenesulfonic acids, eg. dodecylbenzenesulfonic acid, $C_3$–$C_8$-alkylnaphthalene-2-sulfonic acid, naphthalene-2-sulfonic acid/formaldehyde condensates, phenolsulfonic acid/urea/formaldehyde condensates and N-$C_{12}$–$C_{18}$-alkyl-N-methyl-aminoacetic acids in the form of their alkali metal salts or ammonium salts, and preferably the alkali metal salts or ammonium salts of $C_{16}$–$C_{20}$-fatty acids, of abietic acid, of rosin and of hydrogenated or dimerized rosin. Examples of nonionic surfactants suitable for the process according to the invention are adducts of ethylene oxide with fatty acids of 16 to 20 carbon atoms, with their amides, with $C_{16}$–$C_{20}$-alkanols, with $C_{12}$–$C_{20}$-monoalkylamines, with $C_8$–$C_{20}$-alkylphenols, with monoglycerides of fatty acids and with N-(hydroxy-$C_2$–$C_4$-alkyl)-amides of $C_{16}$–$C_{20}$-carboxylic acids. The molar ratio of ethylene oxide to product to be oxyalkylated is in general from 1:1 to 30:1. Products obtained by reacting $C_{12}$–$C_{15}$-oxo-alcohols with from 6 to 20 moles of propylene oxide and then with from 4 to 5 moles of ethylene oxide may also be used. Specific examples of nonionic surfactants are reaction products of rosin with from 30 to 40 moles of ethylene oxide, of tallow alcohol with from 20 to 30 moles of ethylene oxide and of nonylphenol with from 7 to 15 moles of ethylene oxide (per equivalent of OH group capable of undergoing oxyalkylation).

Examples of suitable cationic surfactants are quaternary ammonium compounds, eg. $C_1$–$C_4$-trialkylphenylammonium, di-$C_1$–$C_4$-alkyldibenzylammonium and $C_{10}$–$C_{20}$-alkyl-tri-$C_1$–$C_4$-alkylammonium salts, quaternary trialkylammonium polyglycol ethers, N-$C_{10}$–$C_{16}$-alkylpyridinium salts and N-$C_{10}$–$C_{18}$-imidazolinium salts in the form of the chlorides, sulfates, methylsulfates, toluenesulfonates and benzenesulfonates.

Transparent and at the same time easily dispersible pigmentary forms, of high tinctorial strength, of perylenetetracarboxylic acid bis-p-phenetidide and bis-p-chloroanilide are also obtained if the oxidation is carried out in aqueous suspension, with exposure to shearing forces, in the presence or absence of surfactants.

The shearing forces can conveniently be generated in the aqueous suspension by a grinding medium, preferably by glass balls, ceramic balls, metal balls or plastic balls or by sand, the balls or sand being agitated by high-speed stirrers. Examples of suitable equipment in which to apply shear are sand mills and bead mills.

The amount of the grinding medium is in general from 20 to 40 parts by weight per part by weight of leuco compound.

Here again, the oxidation can be effected by introducing air or by adding the above oxidizing agents before, or before and during, exposure to shearing forces.

If surfactants are used, the compounds mentioned above may conveniently be used. The amount of these is once again in general from 0.2 to 20, preferably from 0.5 to 15, percent by weight, based on the leuco form.

The pigmentary forms obtained by the process according to the invention, when used in baking finishes, give very transparent pure shades and very deeply colored white reductions. The colorations obtained are very pure, with a substantially yellower hue than that of white reductions of prior art pigments.

Regarding the use of the bis-imides, reference may be made to German Published Application DAS 1,197,185 and German Laid-Open Applications DOS 2,545,701, DOS 2,013,672 and DOS 2,121,999.

The Examples which follow illustrate the process according to the invention. Parts and percentages given below are by weight. The specific surface area was determined by nitrogen adsorption, using the BET method.

EXAMPLE 1

50 parts of crude perylenetetracarboxylic acid bis-p-phenetidide (prepared as described in the Example of German Pat. No. 1,113,773), in the form of the moist press cake, are introduced into 1,500 parts of water and the mixture is stirred until homogeneous. 40 parts of 50 percent strength sodium hydroxide solution and 20 parts of sodium dithionite are added at 30° C. and the mixture is stirred for 3 hours at this temperature. The color of the mixture shifts toward bluish violet. After 20 minutes, the sodium salt of the leuco compound (the vat salt) begins to precipitate. After 2.5 hours, 6 parts of rosin soap in the form of the sodium salt are added to the suspension and the latter is stirred for 30 minutes. It is then heated at 60° C., 80 parts of 30 percent strength hydrogen peroxide are added in the course of 3 hours, and stirring is continued foe one hour at 60° C. The suspension is filtered and the red pigment is washed neutral with hot water and dried at 70° C.

Yield: 52 parts of pigment.

In a baking finish, the pigment gives very transparent pure shades, and very deeply colored white reductions. The specific surface area of the pigment was found to be 59 m²/g. Compared to the high-hiding perylenetetracarboxylic acid bis-p-phenetidide pigment of the prior art, the colorations given by the pigment obtained, when used in white reductions, are substantially yellower and purer.

EXAMPLE 2

50 parts of crude perylenetetracarboxylic acid bis-p-phenetidide (prepared by a similar method to Example 2 of British Pat. No. 835,459), in the form of the moist press cake, are introduced into 3,000 parts of water at 60° C. and the mixture is stirred thoroughly. 40 parts of 50 percent strength sodium hydroxide solution and 20 parts of sodium dithionite are then added at 60° C. and the mixture is vatted for three hours, whilst stirring. After two and a half hours, 5 parts of rosin soap in the form of the sodium salt are added to the suspension of the vat salt, and the mixture is stirred for 30 minutes. Thereafter 80 parts of 30 percent strength hydrogen peroxide are added in the course of 3 hours at 60° C., whereupon the suspension is stirred for a further hour. It is filtered, and the pigment is washed neutral with hot water and dried at 70° C.

Yield: 51 parts of pigment.

The pigment has the same properties as that obtained in Example 1.

EXAMPLE 3

50 parts of crude perylenetetracarboxylic acid bis-p-phenetidide (prepared by a method similar to the Example of Swiss Pat. No. 451,943), in the form of the aqueous press cake, are introduced into 3,000 parts of water at 60° C. and the mixture is stirred thoroughly. 40 parts of 50 percent strength by weight sodium hydroxide solution and 20 parts of sodium dithionite are added at 60° C. and the mixture is stirred for 2 hours. 4 parts of diisobutylnaphthalene-1-sulfonic acid in the form of the sodium salt are then added to the suspension of the vat salt and stirring is continued for 1 hour. Thereafter, 70 parts of 30 percent strength hydrogen peroxide are added in the course of 3 hours at 60° C. and stirring is continued for one hour. The suspension is filtered and the pigment is washed neutral with hot water and dried at 70° C.

Yield: 51 parts of a pigment which exhibits the same properties as the pigment obtained in Example 1. The specific surface area is found to be 54 m²/g.

EXAMPLE 4

50 parts of crude perylenetetracarboxylic acid bis-p-phenetidide (prepared by a method similar to Example 3 of U.S. Pat. No. 3,340,264), in the form of the moist press cake, are introduced into 3,000 parts of water at 60° C. and the mixture is stirred thoroughly. Vatting is effected at 60° C. by adding 40 parts of 50 percent strength sodium hydroxide solution and 20 parts of sodium dithionite (duration: 3 hours).

The vat salt which has precipitated is filtered off at 20° C. and washed with blank vat (a solution of 20 parts of 50 percent strength sodium hydroxide solution and 10 parts of sodium dithionite in 1,000 parts of water) until the filtrate is a transparent reddish violet. This requires 1,000 parts of blank vat.

The filter residue is pasted in 3,000 parts of water at 60° C. and the paste is stirred thoroughly with 3 parts of an adduct of 23 moles of ethylene oxide with 1 mole of tallow alcohol. 70 parts of 30 percent strength hydrogen peroxide are added in the course of 2 hours at 60°–70° C. and the suspension is stirred for a further hour. After filtering, washing neutral and drying at 70° C., 48 parts of a pigment are obtained; this has the same properties as the product obtained in Example 1.

EXAMPLE 5

50 parts of crude perylenetetracarboxylic acid bis-p-chloroanilide (prepared by a method similar to Example 1 of U.S. Pat. No. 3,340,264), in the form of the moist press cake, are introduced into 3,000 parts of water at 60° C. and the mixture is stirred until homogeneous. Vatting is effected at 60° C. by adding 40 parts of 50% strength sodium hydroxide solution and 20 parts of sodium dithionite. Duration: 2.5 hours. 3 parts of rosin soap in the form of the sodium salt are then added to the suspension, and the latter is stirred for 30 minutes. Thereafter, 100 parts of 30 percent strength hydrogen peroxide are added in the course of 3 hours at 60° C. and the suspension is stirred for a further hour. It is filtered, the filter residue is stirred into 1,000 parts of water and the mixture is brought to pH 3 with 15 percent strength hydrochloric acid. The pigment is filtered off, washed neutral with water and dried under reduced pressure at 70° C.

Yield: 50 parts of pigment.

In a baking finish, this pigment gives very transparent full shades. In white reductions, the pigment is distinguished by high tinctorial strength. The specific surface area was found to be 63 m²/g. Compared to light-scattering pigments of the same chemical compound, the pigment obtained gives colorations of a more yellow hue in white-reduced baking finishes.

EXAMPLE 6

50 parts of crude perylenetetracarboxylic acid bis-p-chloroanilide (prepared by a method similar to Example 1 of U.S. Pat. No. 3,340,264), in the form of the moist press cake, are introduced into 1,500 parts of water at 60° C. and suspended therein. Vatting is effected at 60° C. by adding 40 parts of 50 percent strength sodium hydroxide solution and 20 parts of sodium dithionite and stirring for 2.5 hours. 5 parts of oleic acid diethanolamide are then added to the suspension of the vat salt, and stirring is continued for 30 minutes. 70 parts of 30 percent strength hydrogen peroxide are then added in the course of 3 hours at 60° C. and the suspension is stirred for a further hour and is then filtered. The filter residue is suspended in 1,000 parts of water and the suspension is brought to pH 3 by adding 15 percent strength hydrochloric acid and is then filtered. The filter residue is washed neutral and dried at 70° C. under reduced pressure.

Yield: 52 parts of a pigment which exhibits the same properties as the pigment obtained in Example 5.

EXAMPLE 7

50 parts of crude perylenetetracarboxylic acid bis-p-chloroanilide (prepared by a method similar to the Example of German Pat. No. 1,113,773) in the form of the moist press cake, are introduced into 3,000 parts of water at 40° C. and suspended therein. 80 parts of 50 percent strength sodium hydroxide solution and 40 parts of sodium dithionite are then added and vatting is effected by stirring for 3 hours at 40° C. The mixture is then cooled to 20° C. and the vat salt which precipitates is filtered off and washed with 200 parts of blank vat.

The press cake of the sodium salt of the leuco compound is converted to a suspension, having a solids content of 10% by adding water. An alkaline solution which contains 6 parts of rosin soap in the form of the sodium salt is then added together with 900 parts of glass beads (diameter 0.8–1 mm). The mixture is stirred by means of a high-speed stirrer for 3 hours at room temperature, with exposure to air. The beads are then sieved off and are washed with 500 parts of water to remove adhering colorant. The aqueous suspension of the pigment is brought to pH 3 with 10 percent strength sulfuric acid and is filtered. The filter residue is washed neutral and dried.

Yield: 48 parts of a pigment which exhibits the same properties as the pigment obtained in Example 5.

EXAMPLE 8

50 parts of crude perylenetetracarboxylic acid bis-p-chloroanilide (prepared by the Example of German Pat. No. 1,113,773) are vatted as described in Example 7. The leuco compound is isolated and washed with blank vat.

The press cake of the sodium salt of the leuco compound is converted to a suspension, having a solids content of 890, by adding water. 20 parts of 50% strength sodium hydroxide solution and 5 parts of sodium dithionite are then added together with 900 parts of glass beads (diameter 0.8–1 mm). The mixture is stirred by means of a high-speed stirrer for 5 hours at room temperature, with exposure to air. The beads are then sieved off and the suspension is worked up as described in Example 7.

The yield is 46 parts of a pigment having similar tinctorial properties to that of Example 5. Full-shade colorations are somewhat less glossy than those obtained with the pigment of Example 5.

We claim:

1. A process for the preparation of a transparent and easily dispersible pigmentary form, of high tinctorial strength of perylene-3,4,9,10-tetracarboxylic acid bis-p-phenetidide and bis-p-chloroanilide, wherein the crude bis-imide is converted to the leuco compound and the latter is oxidized in aqueous suspension (a) in the presence of from 0.2 to 20% by weight, based on the leuco compound, of one or more surfactants or (b) whilst exposed to shearing forces, in the presence or absence of surfactants, at from 20° to 100° C., after which the pigment is isolated.

2. A process as claimed in claim 1, wherein the oxidation of the leuco compound in the presence of surfactants is carried out without exposure to shearing forces.

3. A process as claimed in claim 2, wherein from 0.5 to 15% by weight, based on the leuco compound, of surfactants are used.

4. A process as claimed in claim 1, wherein the crude pigment is converted to the leuco compound in water by means of from 0.3 to 1.5 parts by weight of sodium dithionite per part by weight of crude pigment, and from 0.5 to 2 parts by weight of alkali metal hydroxide per part by weight of sodium dithionite, at from 10° to 80° C.

5. A process as claimed in claim 2, wherein $C_{13}$–$C_{18}$-paraffinsulfonic acids, $C_{13}$–$C_{18}$-paraffindisulfonic acids, sulfosuccinic acid di-$C_1$–$C_4$-alkyl esters, sulfonated oleic acid dibutylamide, $C_8$–$C_{18}$-alkylbenzenesulfonic acids, $C_3$–$C_8$-alkylnaphthalene-2-sulfonic acids, naphthalene-2-sulfonic acid/formaldehyde condensation products, phenolsulfonic acid/urea/formaldehyde condensation products or N-$C_{12}$-$C_{18}$-alkyl-N-methylaminoacetic acids in the form of the alkali metal salts or ammonium salts are used as anionic surfactants, or adducts of ethylene oxide with fatty acids of 16 to 20 carbon atoms, with their amides, with $C_{16}$–$C_{20}$-alkanols, with $C_{12}$–$C_{20}$-monoalkylamines, with $C_8$–$C_{20}$-alkylphenols, with monoglycerides of fatty acids or with N-(hydroxy-$C_2$–$C_4$-alkyl)-carboxylic acid amides of $C_{16}$–$C_{20}$-carboxylic acids, or reaction products of $C_{12}$–$C_{15}$-oxo-alcohols with propylene oxide and ethylene oxide, are used as nonionic surfactants, or $C_1$–$C_4$-trialkylphenylammonium salts, di-$C_1$–$C_4$-alkyldibenzylammonium salts or $C_{10}$–$C_{20}$-alkyl-tri-$C_1$–$C_4$-alkylammonium salts, quaternary trialkylammonium polyglycol ethers, N-$C_{10}$–$C_{16}$-alkylpyridinium salts or N-$C_{10}$–$C_{18}$-imidazolinium salts in the form of the chlorides, sulfates, methylsulfates, toluenesulfonates or benzenesulfonates are used as cationic surfactants.

6. A process as claimed in claim 2, wherein the oxidation is carried out in the presence of anionic of nonionic surfactants.

7. A process as claimed in claim 2, wherein alkali metal salts or ammonium salts of $C_{16}$–$C_{20}$-fatty acids, of abietic acid, of rosin, of hydrogenated rosin or of dimerized rosin, or reaction products of rosin with from 30 to 40 moles of ethylene oxide, of tallow alcohol with from 20 to 30 moles of ethylene oxide or of nonylphenol with from 7 to 15 moles of ethylene oxide per equivalent of OH group which can be oxyalkylated are employed as surfactants.

8. A process as claimed in claim 1, wherein the oxidation of the leuco compound is carried out in the presence or absence of anionic or nonionic surfactants whilst exposed to shearing forces.

9. A process as claimed in claim 8, wherein alkali metal salts or ammonium salts of $C_{16}$–$C_{20}$-fatty acids, of abietic acid, of rosin, of hydrogenated rosin or of dimerized rosin, or reaction products of rosin with from 30 to 40 moles of ethylene oxide, of tallow alcohol with from 20 to 30 moles of ethylene oxide or of nonylphenol with from 7 to 15 moles of ethylene oxide per equivalent of OH group which can be oxyalkylated are employed as surfactants.

10. A process as claimed in claim 1, wherein the oxidation of the leuco compound is carried out at from 40° to 80° C.

11. A process as claimed in claim 2 or 8, wherein the oxidation of the leuco compound is effected with air, oxidizing salts, dilute oxidizing acids, nitro compounds, hydrogen peroxide, alkali metal perborate or alkali metal percarbonate.

* * * * *